(12) United States Patent
Shin et al.

(10) Patent No.: US 11,508,260 B2
(45) Date of Patent: Nov. 22, 2022

(54) DEAF-SPECIFIC LANGUAGE LEARNING SYSTEM AND METHOD

(71) Applicant: ELECTRONICS AND TELECOMMUNICATIONS RESEARCH INSTITUTE, Daejeon (KR)

(72) Inventors: Sung Yong Shin, Daejeon (KR); Jong Moo Sohn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1050 days.

(21) Appl. No.: 16/184,657

(22) Filed: Nov. 8, 2018

(65) Prior Publication Data

US 2019/0295443 A1    Sep. 26, 2019

(30) Foreign Application Priority Data

Mar. 22, 2018  (KR) .................. 10-2018-0033274

(51) Int. Cl.
 *G09B 21/00* (2006.01)
 *G10L 25/51* (2013.01)
 *G10L 15/22* (2006.01)

(52) U.S. Cl.
 CPC ............ *G09B 21/009* (2013.01); *G10L 15/22* (2013.01); *G10L 25/51* (2013.01)

(58) Field of Classification Search
 None
 See application file for complete search history.

(56) References Cited

U.S. PATENT DOCUMENTS

| 9,626,845 B2 | 4/2017 | Eagleman et al. | |
| 2005/0042581 A1 | 2/2005 | Oh et al. | |
| 2008/0177541 A1* | 7/2008 | Satomura ............... | 704/E15.044 |
| 2012/0156660 A1 | 6/2012 | Kwon et al. | |
| 2012/0306631 A1* | 12/2012 | Hughes ................ | G09B 21/009 340/407.1 |
| 2013/0163785 A1* | 6/2013 | Lee ........................... | H03J 7/00 381/103 |
| 2013/0265286 A1* | 10/2013 | Da Costa ................. | G06F 3/016 340/407.1 |
| 2014/0167940 A1* | 6/2014 | Choi ........................ | G08B 6/00 340/407.1 |

(Continued)

FOREIGN PATENT DOCUMENTS

| KR | 10-1999-0030683 A | 5/1999 |
| KR | 10-2002-0003956 A | 1/2002 |

*Primary Examiner* — Quoc D Tran

(57) ABSTRACT

Disclosed is a language learning technology for deaf people. A deaf-specific language learning system includes: a sound input device configured to receive a voice from an external source; a learning server configured to store learning data and correction information; a signal processor configured to output voice pattern information corresponding to a voice signal received from the sound input device; a learning processor configured to output learning pattern information regarding the learning data received from the learning server and also output a learning result through similarity analysis; and an actuator controller configured to vibrate a vibration actuator according to the voice pattern information and the learning pattern information.

8 Claims, 7 Drawing Sheets

(56) References Cited

U.S. PATENT DOCUMENTS

| | | | |
|---|---|---|---|
| 2017/0213568 A1* | 7/2017 | Foshee | G10L 21/16 |
| 2018/0197535 A1* | 7/2018 | Bellah | G09B 21/009 |
| 2019/0108852 A1* | 4/2019 | Eagleman | G10L 13/00 |
| 2019/0206389 A1* | 7/2019 | Kwon | G10L 15/063 |
| 2019/0347948 A1* | 11/2019 | Gill | G06F 9/453 |
| 2021/0074263 A1* | 3/2021 | Malone | G10L 15/02 |

* cited by examiner

DEAF-SPECIFIC LANGUAGE LEARNING SYSTEM AND METHOD

CROSS-REFERENCE TO RELATED APPLICATION

This application claims priority to and the benefit of Korean Patent Application No. 10-2018-0033274, filed on Mar. 22, 2018, the disclosure of which is incorporated herein by reference in its entirety.

BACKGROUND

1. Field of the Invention

The present invention relates to language learning technology for deaf people, and more particularly, to a deaf-specific language learning system and method capable of enabling deaf people to learn a language on the basis of vibration based on pattern information into which learning data is converted.

2. Discussion of Related Art

Communication methods for deaf people include a manual method, a written method, an oral method, and the like. The manual method is the most common communication method used by deaf people who have learned sign language. However, it is not possible to communicate with listeners who have not learned sign language.

The written method is advantageous in that the written method allows deaf people and listeners to communicate by using well-known characters and also is disadvantageous in that the written method has a slow communication speed and many constraints to usage environments because a voice or sign language is not used.

The oral method is a method of grasping the meaning by looking at the mouth shape of a conversation partner. The oral method has limitations of being difficult to master and of allowing conversations to be made only while looking at the face of a conversation partner.

In order to remove the disadvantages experienced by deaf people, research is being conducted on communication aids. As some of the most commonly used communication aids, there are a method of utilizing a cochlear implantation surgery and a method of using a hearing aid.

The cochlear implantation surgery needs a surgical operation, which causes high surgical and maintenance costs, and accompanies side effects such as headache, dizziness, and inconvenience of wearing.

Actually, even after the cochlear implantation surgery, speech conversion may not be possible, and thus it is frequent to have to re-learn sign language.

Hearing aids are meaningless when used by people who wholly lack the sense of hearing and also are accompanied by inconvenience of wearing like the cochlear implantation surgery.

As another method for removing the disadvantages experienced by deaf people, research is being actively conducted on a method of replacing auditory information with tactile information.

The method of replacing auditory information with tactile information is not a short-term method that can improve communication with deaf people immediately after use but a method of improving communication through learning for a certain time period, as with a language.

At present, a technique of utilizing tactile replacement only focuses on device development, and there is little research on learning technology which deaf people may use in communication.

SUMMARY OF THE INVENTION

The present invention has been made to solve the above-mentioned problems of the related art. The present invention is directed to providing a deaf-specific language learning system and method capable of allowing a deaf person to learn a language through vibration of a vibration actuator by converting voice-type learning data into pattern information and operating the vibration actuator on the basis of the pattern information.

According to an aspect of the present invention, there is provided a deaf-specific language learning system including a sound input device configured to receive a voice from an external source; a learning server configured to store learning data and correction information; a signal processor configured to output voice pattern information corresponding to a voice signal received from the sound input device; a learning processor configured to output learning pattern information regarding the learning data received from the learning server and also output a learning result through similarity analysis; and an actuator controller configured to vibrate a vibration actuator according to the voice pattern information and the learning pattern information.

The learning processor may include a learning data input module configured to extract the learning data from the learning server and output the extracted learning data; a pattern information output module configured to output the learning pattern information corresponding to the learning data; and a similarity analysis module configured to calculate a voice similarity score between the learning data and the voice signal, calculate a pattern similarity score between the voice pattern information and the learning pattern information, and total the voice similarity score and the pattern similarity score to output a similarity analysis result.

The similarity analysis module may calculate the voice similarity score by comparing a voice recognition result obtained by performing voice recognition on the voice signal to the learning data.

The similarity analysis module may calculate the pattern similarity score by dividing the voice pattern information and the learning pattern information into sections, performing similarity analysis on each section, and totaling a similarity analysis result for each section.

The learning processor may further include a visualization module configured to visualize and display the learning pattern information and the voice pattern information.

The learning processor may further include a tutor configured to generate feature data indicating a difference between the voice pattern information and the learning pattern information and provide the correction information according to the feature data when the similarity analysis result for each section is less than a reference value.

According to another aspect of the present invention, there is provided a deaf-specific language learning method including outputting learning pattern information corresponding to learning data; driving a vibration actuator on the basis of the learning pattern information; outputting voice pattern information according to a voice signal corresponding to an input voice and also outputting the voice signal; and calculating a voice similarity score between the learning data and the voice signal, calculating a pattern similarity score between the learning pattern information and the voice pattern information, and totaling the voice similarity score and the pattern similarity score to output a similarity analysis result.

The calculating of the voice similarity score may include calculating the voice similarity score by performing voice recognition on the voice signal and comparing a result of the voice recognition to the learning data.

The calculating of the pattern similarity score may include calculating the pattern similarity score by dividing the learning pattern information and the voice pattern information into sections, performing similarity analysis for each section, and totaling a result of the similarity analysis for each section.

The deaf-specific language learning method may further include comparing the similarity analysis result for each section to a reference value, generating feature data indicating a difference between the voice pattern information and the learning pattern information and providing correction information according to the feature data when the similarity analysis result for each section is less than the reference value.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
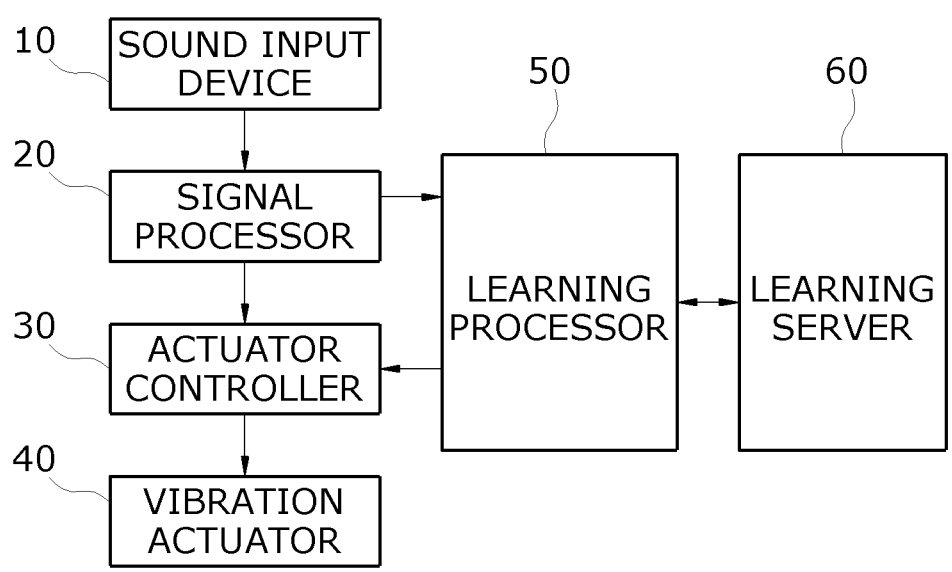
FIG. 1 is a diagram showing an example of a deaf-specific language learning system according to an example embodiment of the present invention.

Specific structural and functional details disclosed herein are merely representative for the purpose of describing example embodiments. However, the present invention may be embodied in many alternate forms and is not to be construed as being limited to only the example embodiments set forth herein.

Accordingly, while example embodiments of the invention are capable of various modifications and alternative forms, embodiments thereof are shown by way of example in the drawings and will herein be described in detail. However, it should be understood, however, that there is no intent to limit example embodiments of the present invention to the particular forms disclosed. Conversely, example embodiments are to cover all modifications, equivalents, and alternatives falling within the scope of the invention.

It should be understood that, although the terms first, second, etc. may be used herein to describe various elements, these elements are not be limited by these terms. These terms are only used to distinguish one element from another. For example, a first element could be termed a second element, and, similarly, a second element could be termed a first element, without departing from the scope of example embodiments of the present invention.

It should be understood that when an element is referred to as being "connected" or "coupled" to another element, the element can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to limit the invention. As used herein, the singular forms "a," "an," and "the" are intended to include the plural forms as well, unless the context clearly indicates otherwise. It should be further understood that the terms "comprises," "comprising," "includes," "including," "has," and/or "having," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

It should also be noted that in some alternative implementations, functions/acts noted in a specific block may occur out of the order noted in a flowchart. For example, two blocks shown in succession may in fact be executed substantially concurrently or may sometimes be executed in a reverse order depending upon functionality/acts involved.

Hereinafter, a deaf-specific language learning system and method proposed in the present invention will be described in detail with reference to the accompanying drawings.

FIG. 1 is a diagram showing an example of a deaf-specific language learning system according to an example embodiment of the present invention.

Referring to FIG. 1, a deaf-specific language learning system 1 according to an example embodiment of the present invention may include a sound input device 10, a signal processor 20, an actuator controller 30, a vibration actuator 40, a learning processor 50, and a learning server 60.

The signal processor 20, the actuator controller 30, and the vibration actuator 40 may be implemented as a single device. The single device including the signal processor 20, the actuator controller 30, and the vibration actuator 40 is hereinafter referred to as a tactile conversion device 100.

The sound input device 10 is a device that receives a voice from the outside. For example, the sound input device 10 may be a microphone.

The sound input device 10 outputs an analog signal (hereinafter referred to as a "voice signal") to the signal processor 20 in response to the received voice.

The signal processor 20 may include at least one processor and memory. As previously programmed, the signal processor 20 generates a pattern for vibrating the vibration actuator 40 based on the voice signal received from the sound input device 10.

That is, as previously programmed, the signal processor 20 generates a pattern corresponding to the voice signal and outputs voice pattern information to the actuator controller 30.

Also, the signal processor 20 may output the voice signal and the voice pattern information to the learning processor 50.

The signal processor 20 may include a filter for removing noise included in the voice signal.

The actuator controller 30 may include at least one processor and memory. As previously programmed, the actuator controller 30 drives the vibration actuator 40 according to the voice pattern information received from the signal processor 20.

Also, the actuator controller 30 drives the vibration actuator 40 according to learning pattern information received from the learning processor 50, as will be described below.

That is, the actuator controller 30 may drive the vibration actuator 40 according to the pattern information received from any one of the signal processor 20 and the learning processor 50.

The actuator controller 30 may operate as previously programmed to control vibration intensity, vibration frequency, or a vibration position of the vibration actuator 40 according to the pattern information (the voice pattern information or the learning pattern information).

The vibration actuator 40 may be driven under the control of the actuator controller 30 to generate vibration. For example, the vibration actuator 40 may be a vibration device.

Since the actuator controller 30 vibrates the vibration actuator 40 according to a pattern corresponding to input voice and learning data, even a deaf person can communicate with a conversation partner on the basis of a felt vibration pattern by just learning a vibration pattern for each voice.

The learning processor 50 may include various devices, such as a personal computer (PC) and a laptop, including hardware such as a memory configured to store necessary programs (or algorithms), a processor configured to execute the programs (or the algorithms) stored in the memory, and a display configured to display a result of the execution.

As previously programmed, the learning processor 50 outputs learning pattern information generated on the basis of data to be learned by deaf people (hereinafter referred to as learning data) to the actuator controller 30 and outputs a result of the learning through similarity analysis between the learning pattern information and the voice pattern information received from the signal processor 20.

In addition, the learning processor 50 may output a result of the learning through similarity analysis between the voice signal and the learning data.

Also, the learning processor 50 may provide correction information on the basis of determination about the learning result.

Also, the learning processor 50 may visualize and provide learning pattern information corresponding to the learning data, voice pattern information corresponding to the voice signal, the learning result, and the like.

Figure 2:
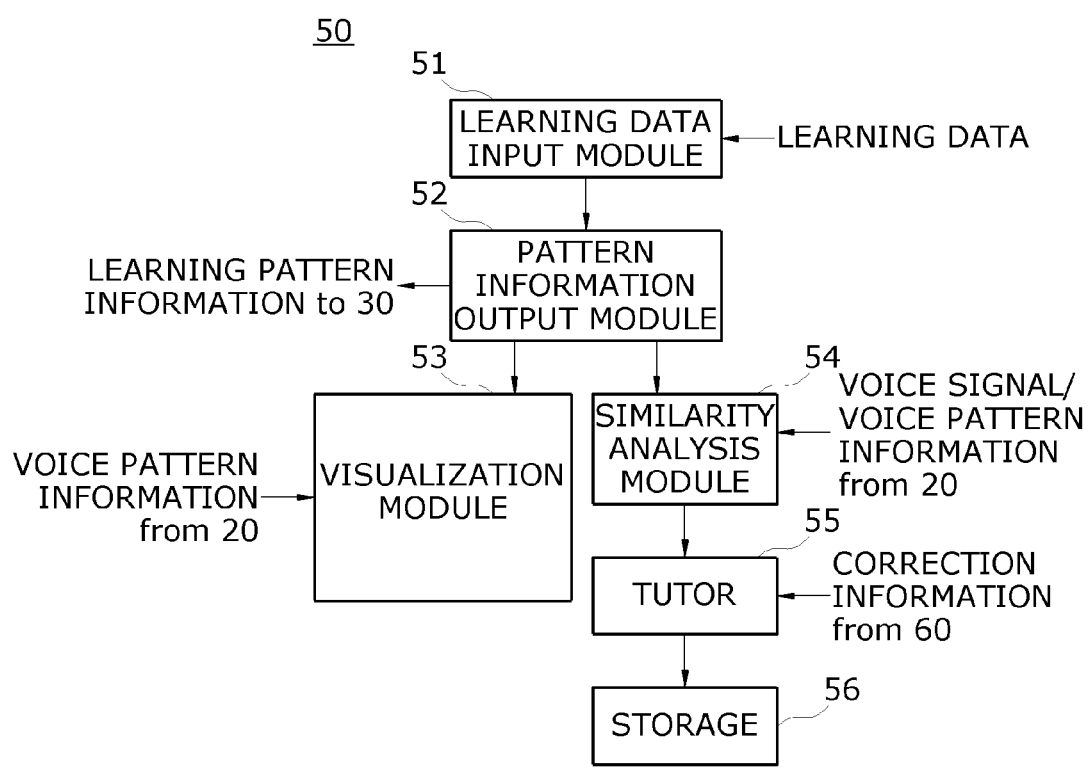
FIG. 2 is a diagram showing an example configuration of a learning processor of a deaf-specific language learning system according to an example embodiment of the present invention.

FIG. 2 is a diagram showing an example configuration of a learning processor of a deaf-specific language learning system according to an example embodiment of the present invention.

As shown in FIG. 2, the learning processor 50 may include a learning data input module 51, a pattern information output module 52, a visualization module 53, a similarity analysis module 54, a tutor 55, and a storage 56.

The learning data input module 51 extracts learning data from the learning server 60 and outputs the extracted learning data to the pattern information output module 52.

For example, the learning data may be voice-type data for a character, a word, a sentence, and the like to be learned by a deaf person.

The learning data input module 51 may extract the learning data from the learning server 60 according to a pre-programmed workflow or may extract the learning data from the learning server 60 depending on a user's choice.

As previously programmed, the pattern information output module 52 outputs learning pattern information corresponding to the learning data received from the learning data input module 51 to the actuator controller 30.

Also, the pattern information output module 52 may output the learning pattern information to the actuator controller 30 and may output the learning pattern information to the visualization module 53 either alone or along with the learning data.

In this case, an algorithm used by the pattern information output module 52 to generate the learning pattern information is the same as an algorithm used by the signal processor 20 to generate voice pattern information.

Thus, with respect to the same data, the signal processor 20 and the pattern information output module 52 outputs the same pattern information.

That is, when the voice signal is the same as the learning data, the signal processor 20 and the pattern information output module 52 output the same pattern information.

The visualization module 53 may visualize and display the voice signal and the voice pattern information received from the signal processor 20.

Also, the visualization module 53 may visualize and display the learning pattern information and the learning data input from the pattern information output module 52.

Thus, the user may check a pattern corresponding to the learning data and a pattern corresponding to his or her pronunciation on the basis of information displayed on the visualization module 53.

The visualization module 53 may be configured to visualize the pattern information as concretely and clearly as possible in order to improve the effectiveness of the learning.

As previously programmed, when the visualization module 53 visualizes the vibration frequency, the visualization module 53 may be configured to display the vibration frequency with different colors.

As previously programmed, when the visualization module 53 visualizes the vibration intensity, the visualization module 53 may be configured to display the vibration intensity with different brightness depending on a ratio of current vibration intensity to the maximum output of the vibration actuator 40.

As previously programmed, when the visualization module 53 visualizes a vibration position, the visualization module 53 may be configured to display the vibration positions with (x, y) coordinates.

For example, the visualization module 53 may include at least one of a Liquid Crystal Display (LCD), a Thin Film Transistor-LCD (TFT-LCD), an Organic Light Emitting Diode (OLED) display, a flexible display, or a three-dimensional (3D) display.

As previously programmed, the similarity analysis module 54 may output a result of analyzing a similarity between the learning pattern information received from the pattern information output module 52 and the voice pattern information received from the signal processor 20.

Also, as previously programmed, the similarity analysis module 54 may output a result of analyzing a similarity between the learning data received from the pattern information output module 52 and the voice signal received from the signal processor 20.

For example, the similarity analysis module 54 may output a result of analyzing the similarity to the visualization module 53 and the tutor 55.

In this case, the similarity analysis module 54 may analyze the two pieces of pattern information and then digitize and output a similarity between the two pieces of pattern information.

The tutor 55 checks the similarity analysis result. When it is determined that the user's voice needs to be corrected, the tutor 55 provides correction information so that the user can assist in correcting the voice.

For example, when a result of checking the similarity analysis result is that the similarity is less than or equal to a predetermined reference value, the tutor 55 may determine that the user's voice needs to be corrected.

The tutor 55 stores the similarity analysis result (including a section-specific similarity analysis result, a voice similarity score, a pattern similarity score, and the like) in the storage 56.

Also, the information stored in the storage 56 is transmitted to the learning server 60 periodically or upon an external request.

For example, the tutor 55 may transmit the information stored in the storage 56 to the learning server 60.

Alternatively, the tutor 55 may be implemented to transmit the stored information to the learning server 60.

The learning server 60 stores the learning data and the correction information to be provided to the learning processor 50 and provides the learning data and the correction information upon an external request or as previously programmed.

Figure 3:
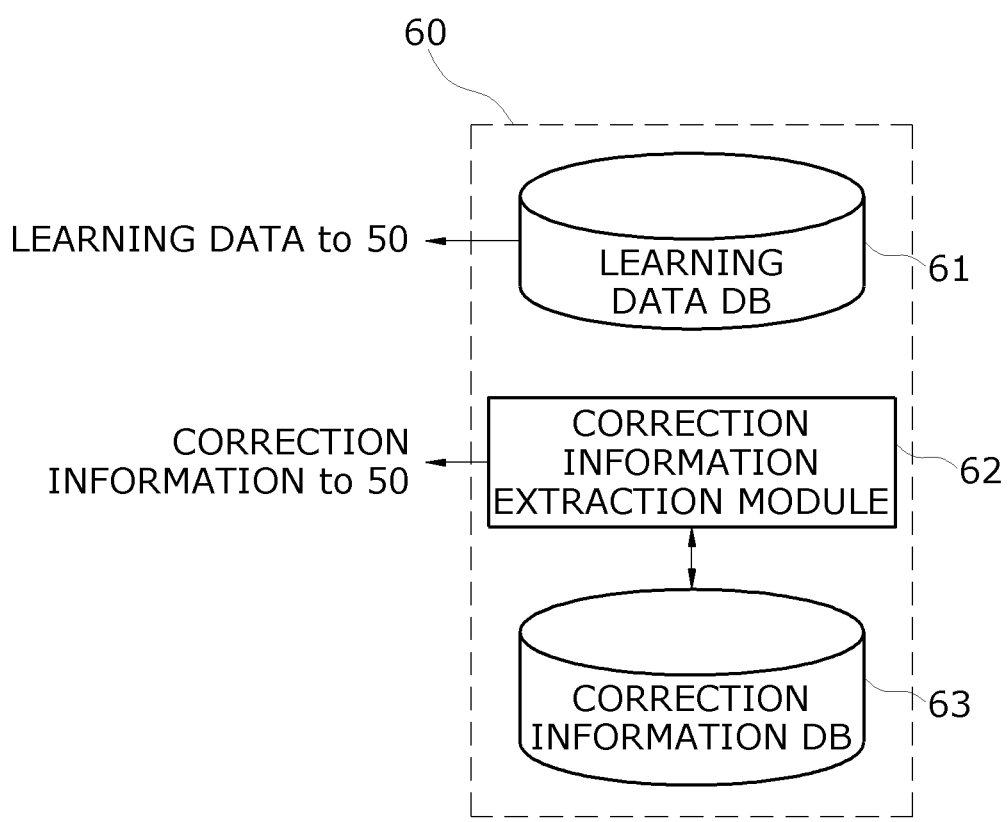
FIG. 3 is a diagram showing an example configuration of a learning server of a deaf-specific language learning system according to an example embodiment of the present invention.

FIG. 3 is a diagram showing an example configuration of a learning server of a deaf-specific language learning system according to an example embodiment of the present invention.

As shown in FIG. 3, the learning server 60 may include a learning data database 61, a correction information extraction module 62, and a correction information database 63.

The learning data database 61 stores the learning data to be provided to the learning processor 50 in order for the user to learn the language.

The learning data stored in the learning data database 61 may be voice-type data for a character, a word, a sentence, and the like to be learned by a deaf person.

Also, the learning data database 61 may include a mouth shape image, a sign language, and a picture associated with the learning data.

For example, the learning data database 61 may be built for deaf people by utilizing data used by a conventional language education system.

When a request is made by an external source, for example, the learning processor 50, the correction information extraction module 62 extracts correction information corresponding to the request from the correction information database 63 and provides the extracted correction information to the learning processor 50.

The correction information database 63 stores correction information that is provided for the user's pronunciation correction.

The correction information stored in the correction information database 63 may be a language therapist's comments.

For example, the correction information database 63 may be built through a process of providing the similarity analysis result stored in the correction information database 63 to a language therapist through a separate system and enabling the language therapist to enter comments for each similarity analysis result.

Also, the correction information database 63 may store correction information for each piece of feature data indicating differences between the voice pattern information and the learning pattern information.

Thus, the correction information extraction module 62 may provide, to the learning processor 50, correction information corresponding to feature data input from the learning processor 50.

Depending on the implementation, the correction information database 63 may store degrees of improvement along with the correction information.

For example, the correction information database 63 may store degrees of improvement of the user's voice before and after the correction information is provided, along with the correction information.

As an example of storing the degrees of improvement, after the correction information for the voice is provided according to the determination of the tutor 55 of the learning processor 50, the user may enter the same voice through the sound input device 10, the similarity analysis module 54 of the learning processor 50 may perform similarity analysis on the entered voice, and the tutor 55 of the learning processor 50 may compare a current similarity analysis result and a previous similarity analysis result, determine the degrees of improvement, and store the degrees of improvement for the correction information in the correction information database 63.

As described above, when the tutor 55 of the learning processor 50 stores the degrees of improvement in the correction information database 63 along with the correction information, the tutor 55 may set priorities of the correction information in descending order of the degrees of improvement.

Also, when the correction information extraction module 62 provides the correction information corresponding to the feature data input from the learning processor 50, the correction information extraction module 62 may preferentially provide a piece of the correction information with a higher priority (that is, a high degree of improvement) and thus may accurately and efficiently correct the user's pronunciation.

The elements, and their operations, of the deaf-specific language learning system according to an example embodiment of the present invention have been described above. Some of the elements of the deaf-specific language learning system according to an example embodiment of the present invention will be described in detail below.

Figure 4:
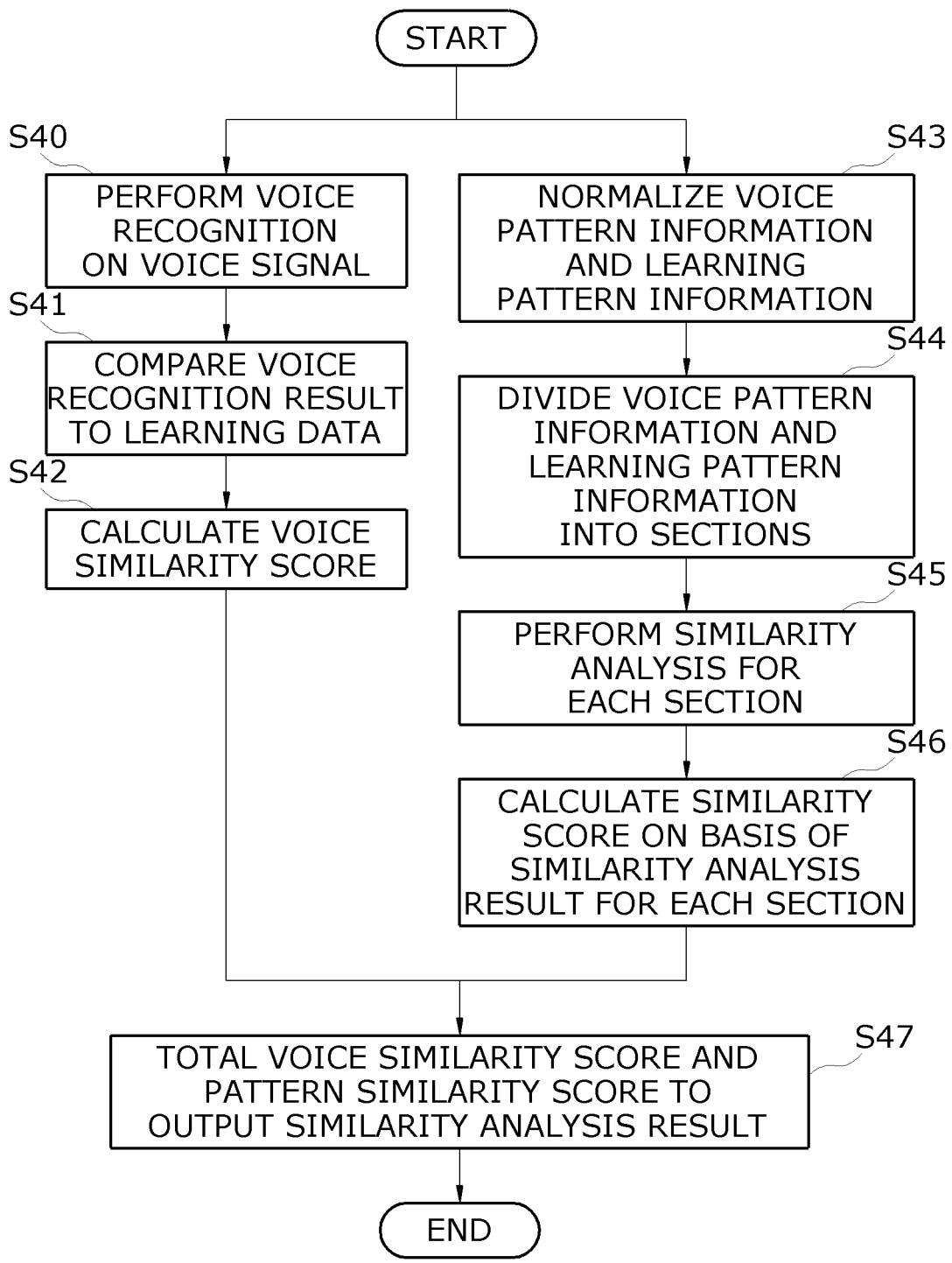
FIG. 4 is a flowchart illustrating an operation of a similarity analysis module of a deaf-specific language learning system according to an example embodiment of the present invention.

FIG. 4 is a flowchart illustrating an operation of a similarity analysis module of a deaf-specific language learning system according to an example embodiment of the present invention.

Referring to FIG. 4, the similarity analysis module 54 calculates a voice similarity score and a pattern similarity score and totals both the calculated scores to output a similarity analysis result.

In detail, the similarity analysis module 54 performs voice recognition on the voice signal received from the signal processor 20 (S40), compares a result of the voice recognition and the learning data received from the pattern information output module 52 (S41), and calculates the voice similarity score (S42).

In order to calculate the pattern similarity score, the similarity analysis module 54 may selectively normalize the voice pattern information received from the signal processor 20 and the learning pattern information received from the pattern information output module 52 (S43).

In this case, the similarity analysis module 54 may match pronunciation lengths, pronunciation speeds, voice properties (e.g., tones, intonations), and the like of the two patterns through normalization.

After the normalization, the similarity analysis module 54 divides the two patterns into sections according to a predetermined section division algorithm (S44) and performs similarity analysis for each section (S45).

In this case, the similarity analysis module 54 may divide the two patterns into the sections on the basis of the same sampling frequency.

Also, the similarity analysis module 54 may output a result of the similarity analysis for each section to the tutor 55.

When the section division is performed, the similarity analysis module 54 may have section division criteria such as a frame, a syllable, and a pronunciation symbol for each pattern.

When similarity analysis is performed for each section, the similarity analysis module 54 may have similarity analysis criteria such as an entire similarity between the patterns, a change similarity between the patterns, and the like.

Also, the similarity analysis module 54 totals (e.g., averages or adds) the result of the similarity analysis for each section as previously programmed and calculates the pattern similarity score (S46).

Subsequently, the similarity analysis module 54 totals (e.g., averages or adds) the voice similarity score and the pattern similarity score as previously programmed and outputs a similarity analysis result (S47).

Figure 5:
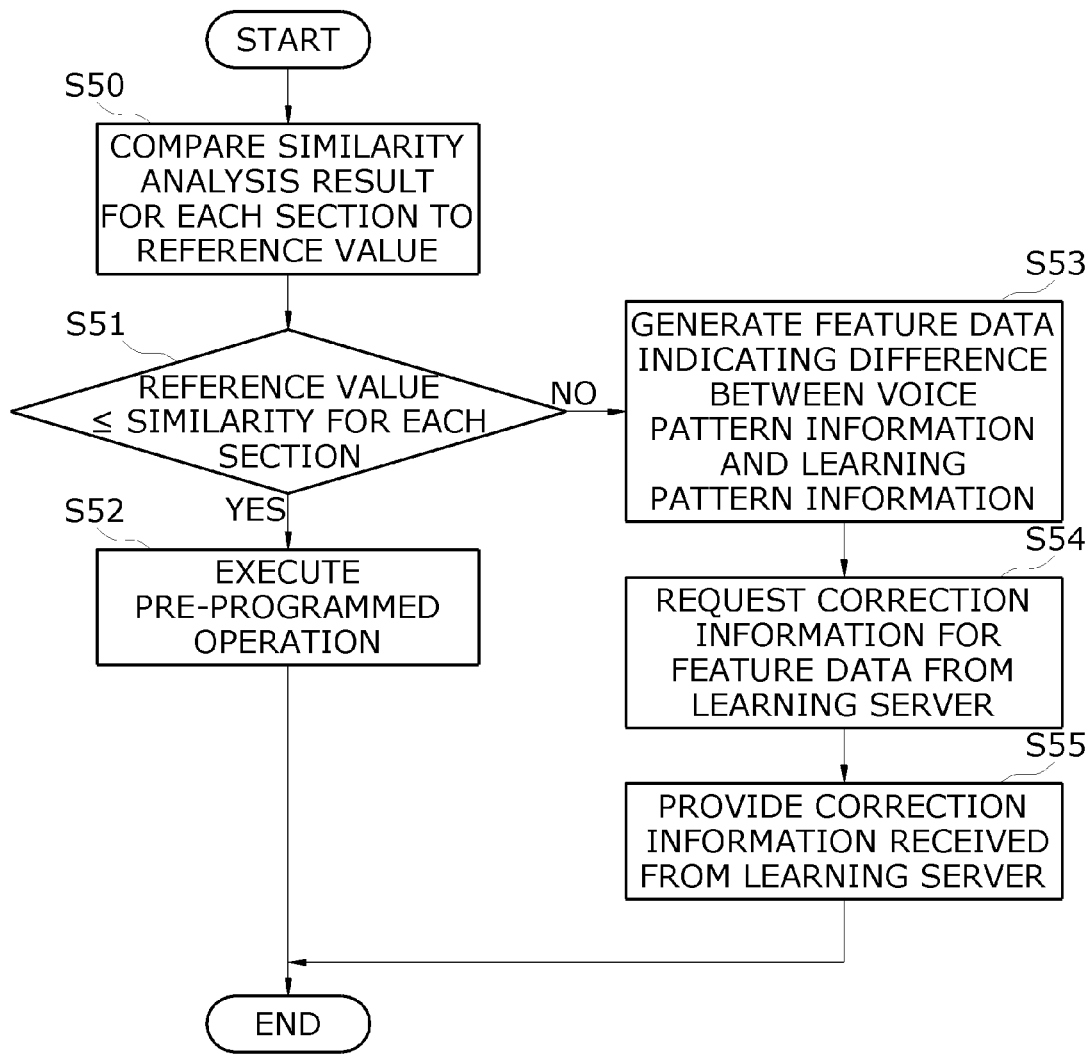
FIG. 5 is a flowchart illustrating an operation of a tutor of a deaf-specific language learning system according to an example embodiment of the present invention.

FIG. 5 is a flowchart illustrating an operation of a tutor of a deaf-specific language learning system according to an example embodiment of the present invention. Referring to FIG. 5, the tutor 55 of the deaf-specific language learning system 1 compares the similarity analysis result for each section received from the similarity analysis module 54 to a reference value (S50) and determines whether a similarity for each section is greater than or equal to a predetermined reference value (S51).

When a result of the determination in step S51 is that the similarity for each section is greater than or equal to the reference value (yes in S51), the tutor 55 performs a pre-programmed operation (e.g., an operation of storing an analysis result, an operation of outputting an analysis result to the visualization module 53, etc.) (S52) and ends the operation.

When a result of the determination in step S51 is that the similarity for each section is less than the reference value (no in S51), the tutor 55 recognizes that a voice corresponding to each section needs to be corrected and provides correction information.

In this case, the tutor 55 generates feature data using an algorithm (e.g., a differential function) for generating data indicating a difference between the voice pattern information and the learning pattern information (S53).

An algorithm to be used by the tutor 55 to generate feature data is previously programmed.

Also, the tutor 53 may request correction information of the feature data from the learning server 60 (S54) and may provide the correction information provided from the learning server 60 in response to the request (S55).

The elements, and their operations, of the deaf-specific language learning system according to an example embodiment of the present invention have been described above. The entire operation of the deaf-specific language learning system according to an example embodiment of the present invention will be described below.

Figure 6:
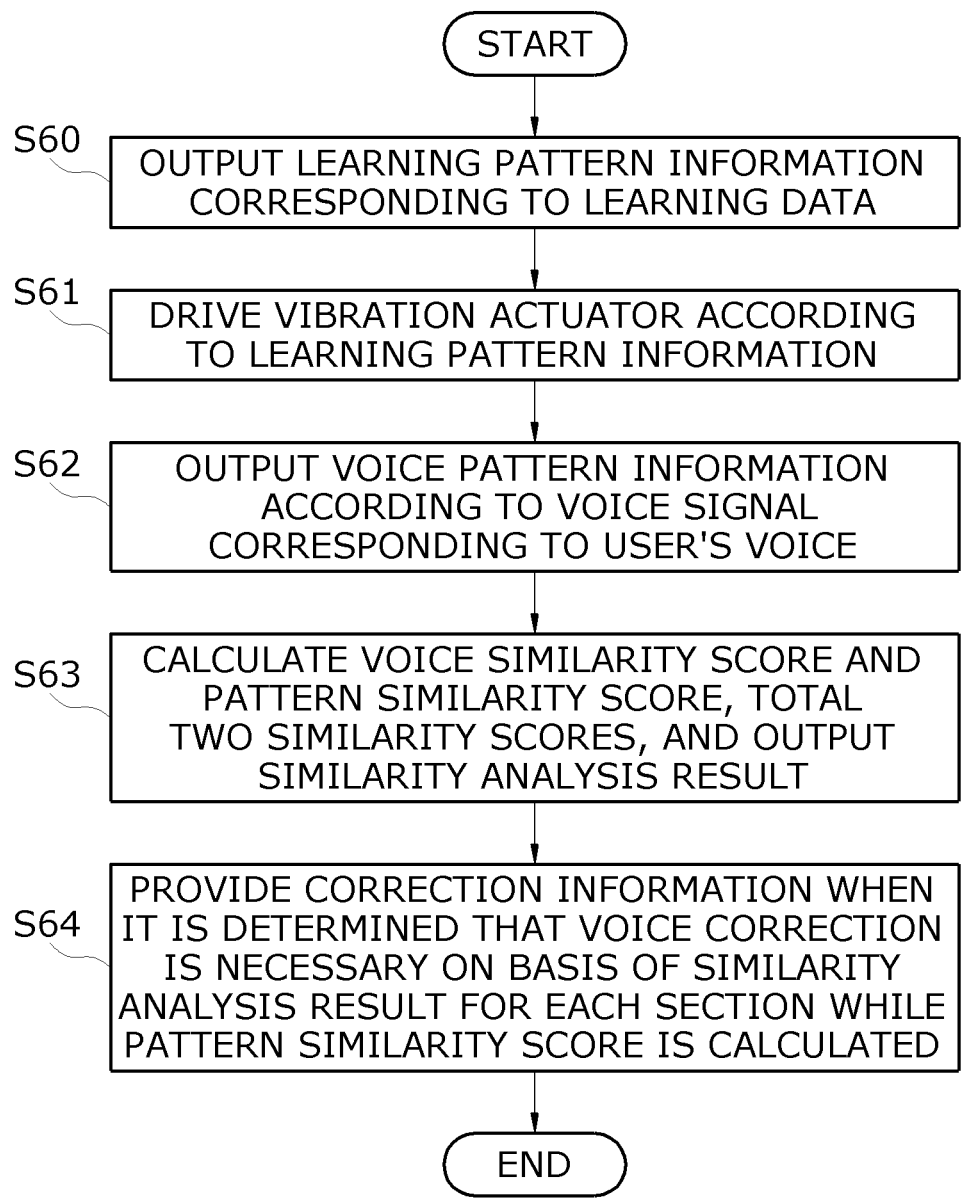
FIG. 6 is a flowchart illustrating an operation of a deaf-specific language learning system according to an example embodiment of the present invention.

FIG. 6 is a flowchart illustrating an operation of a deaf-specific language learning system according to an example embodiment of the present invention.

The step-by-step operations shown in FIG. 6 may be performed by the deaf-specific language learning system 1 that has been described with reference to FIGS. 1 to 5.

First, the learning processor 50 outputs learning pattern information corresponding to learning data extracted from the learning server 60 (S60).

In step S60, the learning processor 50 may visualize and display either only the learning pattern information or both the learning pattern information and the learning data.

Based on the learning pattern information output in step S60, the actuator controller 30 drives the vibration actuator 40 (S61).

Thus, a user (e.g., a deaf person) who wishes to learn a language using the deaf-specific language learning system 1 according to the present invention may learn a language through vibration of the vibration actuator 40.

Also, since the deaf-specific language learning system 1 of the present invention visualizes and displays the learning pattern information and the learning data, the user may clearly recognize what learning data is meant by vibration.

After step S61, when the user utters the learning data learned through the vibration, the signal processor 20 outputs voice pattern information according to a voice signal corresponding to the voice and also outputs the voice signal (S62).

In step S62, the signal processor 20 may visualize and display the voice pattern information through the learning processor 50.

Thus, through the visualized information, the user may visually check his or her pronunciation.

According to the output voice pattern information in step S62, the actuator controller 30 vibrates the vibration actuator 40 so that the user may tactually check his or her pronunciation.

After step S62, the learning processor 50 calculates a similarity score between the learning data and the voice signal (a voice similarity score), calculates a similarity score between the learning pattern information and the voice pattern information (a pattern similarity score), and totals the voice similarity score and the pattern similarity score to output a similarity analysis result (S63).

The calculation of the voice similarity score in step S63 may be made through steps S40 to S42 of FIG. 4.

The calculation of the pattern similarity score in step S63 may be made through steps S40 to S42 of FIG. 4.

After step S63, the learning processor 50 determines whether voice correction is necessary on the basis of the similarity analysis result for each section while the pattern similarity score is being calculated and provides correction information when it is determined that the voice correction is necessary (S64).

The determination of whether the voice correction is necessary and the provision of the correction information in step S64 may be made through steps S50 to S55 of FIG. 5.

Figure 7:
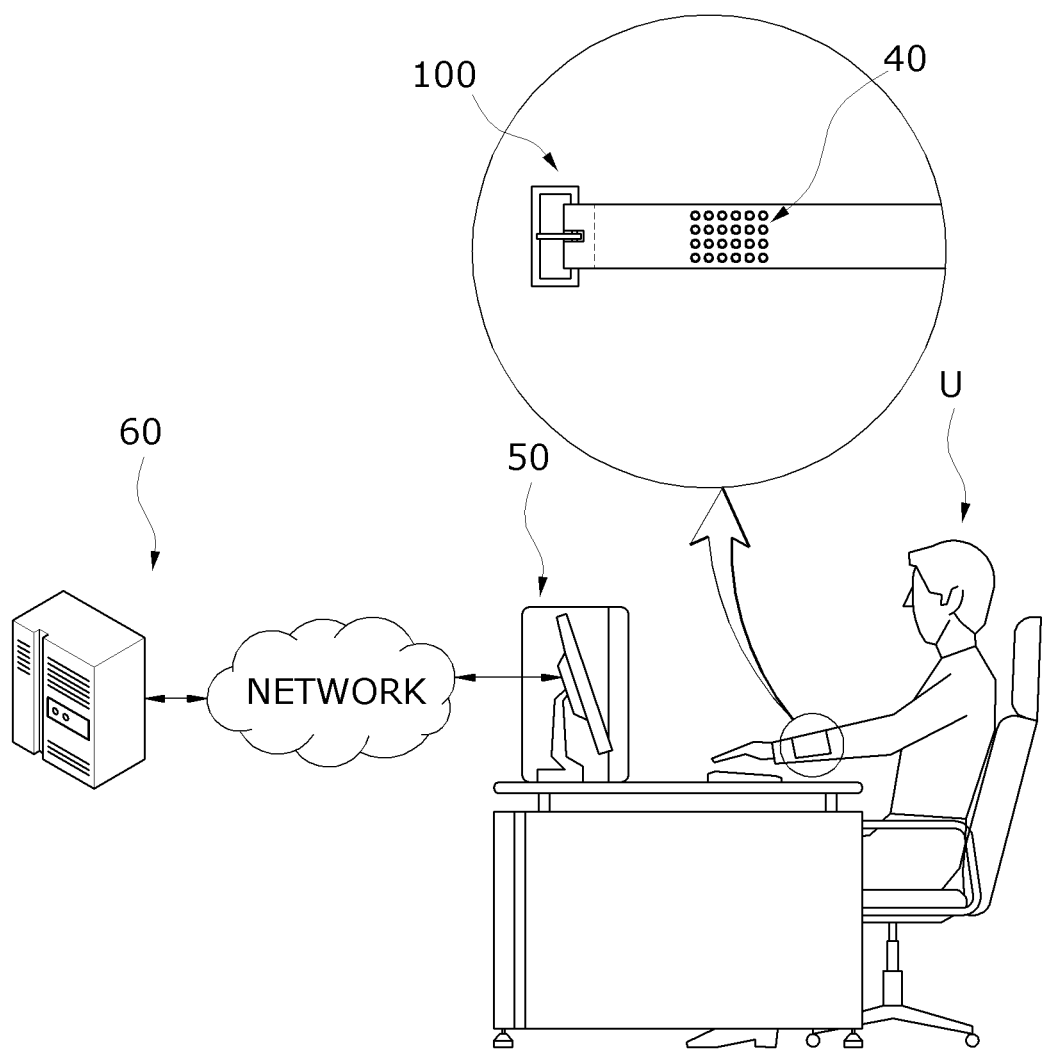
FIG. 7 is a diagram showing an example in which a user learns a language using a deaf-specific language learning system according to an example embodiment of the present invention.

FIG. 7 is a diagram showing an example in which a user learns a language using a deaf-specific language learning system according to an example embodiment of the present invention.

As shown in FIG. 7, a user U learns a language using the learning processor 50 while wearing the tactile conversion device 100, and the learning processor 50 receives learning data and correction information and provides the learning data and the correction information to the user U through communication with the learning server 60 connected over a network.

According to an embodiment of the present invention, it is possible for deaf people to learn a language through a system because there is provided a language learning technology for deaf people that allows the deaf people to tactually learn the language on the basis of pattern information corresponding to learning data.

In particular, according to an embodiment of the present invention, there is provided a result of similarity analysis between learning data and a user's voice and a result of similarity analysis between pattern information corresponding to the learning data and pattern information corresponding to the voice.

Also, according to an embodiment of the present invention, correction information is provided on the basis of a similarity analysis result as necessary.

Accordingly, it is possible to increase access to a voice language because a user can study without the help of an expert.

Even though all of the elements of the above-described embodiments of the present invention have been described as being combined into a single component or operating in combination, the invention is not necessarily limited to these embodiments. In other words, within the scope of the invention, all the elements may be selectively combined into one or more elements to operate. Also, each element may be implemented with one independent hardware device, but some or all of the elements may be selectively combined and implemented as a computer program having a program module for performing some or all functions combined in one or more hardware devices. Further, such a computer program may be stored in a computer-readable recording medium such as a universal serial bus (USB) memory, a compact disc (CD), a flash memory, or the like. The embodiment of the present invention may be implemented by reading and executing the computer program. Examples of the computer-readable recording medium may include a magnetic recording medium, an optical recording medium, a carrier wave medium, and the like.

So far, the deaf-specific language learning system and method according to the present invention have been described with reference to the example embodiments.

However, the present invention is not limited to the example embodiments, and it is obvious to those skilled in the art that various alternatives, modifications, and changes can be made without departing from the spirit and scope of the invention.

Accordingly, the embodiments and the accompany drawings of the present invention are to be considered in a descriptive sense only and not for purposes of limitations and do not limit the technical scope of the invention. The scope of the invention should be construed by the appended claims, and all technical ideas within the scope of their equivalents should be construed as being included in the scope of the invention.

What is claimed is:

1. A deaf-specific language learning system comprising:
   a sound input device configured to receive a voice from an external source;
   a learning server configured to store learning data and correction information;
   a signal processor configured to output voice pattern information corresponding to a voice signal received from the sound input device;
   a learning processor configured to output learning pattern information regarding the learning data received from the learning server and also output a learning result through similarity analysis; and
   an actuator controller configured to vibrate a vibration actuator according to the voice pattern information and the learning pattern information,
   wherein the learning processor comprises a similarity analysis module configured to calculate a voice similarity score between the learning data and the voice signal, calculate a pattern similarity score between the voice pattern information and the learning pattern information, and total the voice similarity score and the pattern similarity score to output a similarity analysis result, and
   wherein the similarity analysis module calculates the pattern similarity score by dividing the voice pattern information and the learning pattern information into sections, performing similarity analysis on each section, and totaling a similarity analysis result for each section.

2. The deaf-specific language learning system of claim 1, wherein the learning processor further comprises:
   a learning data input module configured to extract the learning data from the learning server and output the extracted learning data; and
   a pattern information output module configured to output the learning pattern information corresponding to the learning data.

3. The deaf-specific language learning system of claim 2, wherein the similarity analysis module calculates the voice similarity score by comparing a voice recognition result obtained by performing voice recognition on the voice signal to the learning data.

4. The deaf-specific language learning system of claim 2, wherein the learning processor further comprises a visualization module configured to visualize and display the learning pattern information and the voice pattern information.

5. The deaf-specific language learning system of claim 2, wherein the learning processor further comprises a tutor configured to generate feature data indicating a difference between the voice pattern information and the learning pattern information and provide the correction information according to the feature data when the similarity analysis result for each section is less than a reference value.

6. A deaf-specific language learning method comprising:
outputting learning pattern information corresponding to learning data;
driving a vibration actuator on the basis of the learning pattern information;
outputting voice pattern information according to a voice signal corresponding to an input voice and also outputting the voice signal; and
calculating a voice similarity score between the learning data and the voice signal, calculating a pattern similarity score between the learning pattern information and the voice pattern information, and totaling the voice similarity score and the pattern similarity score to output a similarity analysis result,
wherein the calculating of the pattern similarity score comprises calculating the pattern similarity score by dividing the learning pattern information and the voice pattern information into sections, performing similarity analysis for each section, and totaling a result of the similarity analysis for each section.

7. The deaf-specific language learning method of claim 6, wherein the calculating of the voice similarity score comprises calculating the voice similarity score by performing voice recognition on the voice signal and comparing a result of the voice recognition to the learning data.

8. The deaf-specific language learning method of claim 7, further comprising comparing the similarity analysis result for each section to a reference value, generating feature data indicating a difference between the voice pattern information and the learning pattern information and providing correction information according to the feature data when the similarity analysis result for each section is less than the reference value.

\* \* \* \* \*